US010495466B2

(12) United States Patent
Mwakibinga et al.

(10) Patent No.: US 10,495,466 B2
(45) Date of Patent: Dec. 3, 2019

(54) SYSTEM AND METHOD FOR DETERMINING A LOCATION OF A VEHICLE RELATIVE TO A STOPPING POINT

(71) Applicant: SIEMENS INDUSTRY, INC., Alpharetta, GA (US)

(72) Inventors: Thomas Mwakibinga, Poughkeepsie, NY (US); Fahd Iqbal, New York, NY (US); Torsten Scherling, Berlin (DE); Torsten Pannier, Jersey City, NJ (US)

(73) Assignee: SIEMENS MOBILITY, INC., New York, NY (US)

( * ) Notice: Subject to any disclaimer, the term of this patent is extended or adjusted under 35 U.S.C. 154(b) by 438 days.

(21) Appl. No.: 14/834,973

(22) Filed: Aug. 25, 2015

(65) Prior Publication Data
US 2017/0059329 A1   Mar. 2, 2017

(51) Int. Cl.
*G01C 21/12* (2006.01)
*G01C 21/20* (2006.01)
*H04R 29/00* (2006.01)
*G01C 21/00* (2006.01)
*G01C 21/26* (2006.01)
*G09B 29/10* (2006.01)
*G01C 21/36* (2006.01)

(52) U.S. Cl.
CPC ............ *G01C 21/20* (2013.01); *G01C 21/12* (2013.01); *H04R 29/004* (2013.01); *G01C 21/00* (2013.01); *G01C 21/26* (2013.01); *G01C 21/362* (2013.01); *G09B 29/106* (2013.01)

(58) Field of Classification Search
USPC .............................. 701/48, 500, 408–409, 36
See application file for complete search history.

(56) References Cited

U.S. PATENT DOCUMENTS

| 8,262,034 | B2 * | 9/2012 | Wolf | A63H 19/14 |
| | | | | 246/1 C |
| 9,296,401 | B1 * | 3/2016 | Palmer | B61L 15/0072 |
| 2004/0049327 | A1 * | 3/2004 | Kondratenko | B61L 3/125 |
| | | | | 701/19 |
| 2010/0318294 | A1 * | 12/2010 | Rosing | G01C 21/165 |
| | | | | 701/500 |
| 2011/0021234 | A1 * | 1/2011 | Tibbitts | H04W 48/04 |
| | | | | 455/517 |

(Continued)

OTHER PUBLICATIONS

Thomas Stockx et al: "SubwayPS", Proceedings of the 22nd ACM SIGSPATIAL International Conference on Advances in Geographic Information Systems, SIGSPATIAL '14, Jan. 1, 2014 (Jan. 1, 2014), pp. 93-102, XP055311872, New York, NY, USA DOI: 10.1145/2666310.2666396, ISBN: 978-1-4503-3131-9.

(Continued)

*Primary Examiner* — Cuong H Nguyen

(57) ABSTRACT

A system and method for determining a location of a vehicle relative to a station of the vehicle are described. The system includes a user interface device with a memory device storing a computer program with executable instructions, the computer program including first executable instructions to detect a vehicle brake application and second executable instructions to detect audio data emitted by the vehicle, the first and second executable instructions being performed to determine a location of the vehicle relative to a station of the vehicle.

15 Claims, 3 Drawing Sheets

(56) References Cited

U.S. PATENT DOCUMENTS

| | | | |
|---|---|---|---|
| 2011/0095876 A1* | 4/2011 | Tanaka | H04M 1/72522 340/407.1 |
| 2011/0307188 A1* | 12/2011 | Peng | G06Q 10/0639 702/33 |
| 2012/0007713 A1* | 1/2012 | Nasiri | G06F 1/1694 340/5.81 |
| 2012/0244883 A1* | 9/2012 | Tibbitts | H04W 48/04 455/456.2 |
| 2013/0090801 A1* | 4/2013 | Backes | B61L 23/10 701/23 |
| 2013/0122928 A1* | 5/2013 | Pfluger | G01P 13/00 455/456.1 |
| 2014/0019247 A1* | 1/2014 | Melanson | H04M 1/72572 705/14.58 |
| 2014/0106784 A1* | 4/2014 | Tanaka | H04M 1/72522 455/456.3 |
| 2014/0277860 A1* | 9/2014 | Pulliam | B60L 15/20 701/19 |
| 2014/0277883 A1* | 9/2014 | Pulliam | B60L 15/20 701/22 |
| 2014/0309872 A1* | 10/2014 | Ricci | H04W 48/04 701/36 |
| 2014/0310610 A1* | 10/2014 | Ricci | H04W 48/04 715/744 |
| 2014/0364108 A1* | 12/2014 | Tibbitts | H04W 48/04 455/419 |
| 2017/0021847 A1* | 1/2017 | LeFebvre | B61L 15/0027 |

OTHER PUBLICATIONS

Samuli Hemminki et al: "Accelerometer-based transportation mode detection on smartphones", Proceedings of the 11th ACM Conference on Embedded Networked Sensor Systems, Sensys 13, Jan. 1, 2013 (Jan. 1, 2013), pp. 1-14, XP055311881, New York, New York, USA DOI: 10.1145/2517351.2517367, ISBN: 978-1-4503-2027-6.

Arvind Thiagarajan et al: "Cooperative transit tracking using smartphones", Proceedings of the 8th ACM Conference on Embedded Networked Sensor Systems, SENSYS '10, ACM Press, New York, New York, USA, Nov. 3, 2010 (Nov. 3, 2010), pp. 85-98, XP058209069, DOI: 10.1145/1869983.1869993, ISBN: 978-1-4503-0344-6.

Jonathan Lester et al: "A Practical Approach to Recognizing Physical Activities", Jan. 1, 2006 (Jan. 1, 2006), Pervasive Computing Lecture Notes in Computer Science; LNCS, Springer, Berlin, DE, pp. 1-16, XP019031523, ISBN: 978-3-540-33894-9.

PCT International Search Report and Written Opinion dated Nov. 3, 2016 corresponding to PCT Application No. PCT/US2016/043808 filed Jul. 25, 2016 (12 pages).

* cited by examiner

SYSTEM AND METHOD FOR DETERMINING A LOCATION OF A VEHICLE RELATIVE TO A STOPPING POINT

BACKGROUND

1. Field

Aspects of the present invention relate to a system and method for determining a location of a vehicle, for example an underground vehicle, relative to a stopping point, herein also referred to station, of the vehicle, whereby the method and system are adapted to be performed as a mobile application on a mobile handheld device.

2. Description of the Related Art

Users of mobile devices, for example smart phones, are able to determine their location almost everywhere thanks to technologies like GPS and Wi-Fi positioning. But underground public transportation systems, which are largely inaccessible to GPS signals and are often out of range of Wi-Fi networks, represent an important type of space in which mobile devices cannot reliably determine locations. For example, when a local or a tourist travels with an underground vehicle, for example the subway in New York City, and wants to know when the desired final station has been reached in order to exit the subway, he or she has currently the following options, which are for example: paying attention and counting all the stations, setting a timer with the time it approximately takes for the subway to reach the desired station based on the subway schedule, or asking someone in the subway. Otherwise, the desired station may be missed. It would be desirable that the local or tourist does not need to pay attention during the ride and could just use a mobile device for determining the stations of the subway, for example in order to exit the subway at the desired station.

SUMMARY

Briefly described, aspects of the present invention relate to a system and method for determining locations of a vehicle, for example an underground vehicle, relative to stopping points, i.e., stations, of the underground vehicle.

A first aspect of the invention provides a system for determining a location of a vehicle relative to a stopping point, the system comprising a user interface device comprising a memory device storing a computer program with executable instructions, the computer program comprising first executable instructions to detect a vehicle brake application and second executable instructions to detect audio data emitted by the vehicle, the first and second executable instructions being performed to determine a location of the vehicle relative to a designated stopping point of the vehicle.

A second aspect of the invention provides a computer program product embodied in a computer-readable medium comprising instructions to detect a vehicle brake application; instructions to detect audio data emitted by the vehicle, wherein the first and second executable instructions being performed to determine a location of the vehicle relative to a designated stopping point of the vehicle.

A third aspect of the invention provides a method for determining a location of a vehicle relative to a station comprising performing a first algorithm to detect a brake application of the vehicle, performing a second algorithm to detect a predefined audio information of the vehicle, and determining a location of the vehicle relative to a designated station of the vehicle based upon performed first and second algorithm.

DETAILED DESCRIPTION

To facilitate an understanding of embodiments, principles, and features of the present invention, they are explained hereinafter with reference to implementation in illustrative embodiments. In particular, they are described in the context of being sound-and-accelerometer-based localization algorithm for en route station stops detection application, also referred to as "smart phone app with GPS/Wi-Fi independent location analysis". Embodiments of the present invention, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

In an exemplary embodiment, aspects of the present invention relate to a mobile application provided on a handheld device, such as a smart phone, tablet, or like device, that permits a user to walk freely without wired tethering. In an alternative embodiment, a hands-free device can be used in aspects of the present invention. The system for determining a location of a vehicle relative to a stopping point is referred to herein, oftentimes, for simplicity, as the "localization system".

Users of mobile devices, for example smart phones, are able to determine their location almost everywhere thanks to technologies like GPS and Wi-Fi positioning. But underground public transportation systems, which are largely inaccessible to GPS signals and are often out of range of Wi-Fi networks, represent an important type of space in which mobile devices cannot reliably determine locations. The presented localization system comprises a method and application for determining a location of a vehicle, in particular an underground vehicle, relative to a station of the vehicle without the need of GPS or Wi-Fi positioning.

Figure 1:
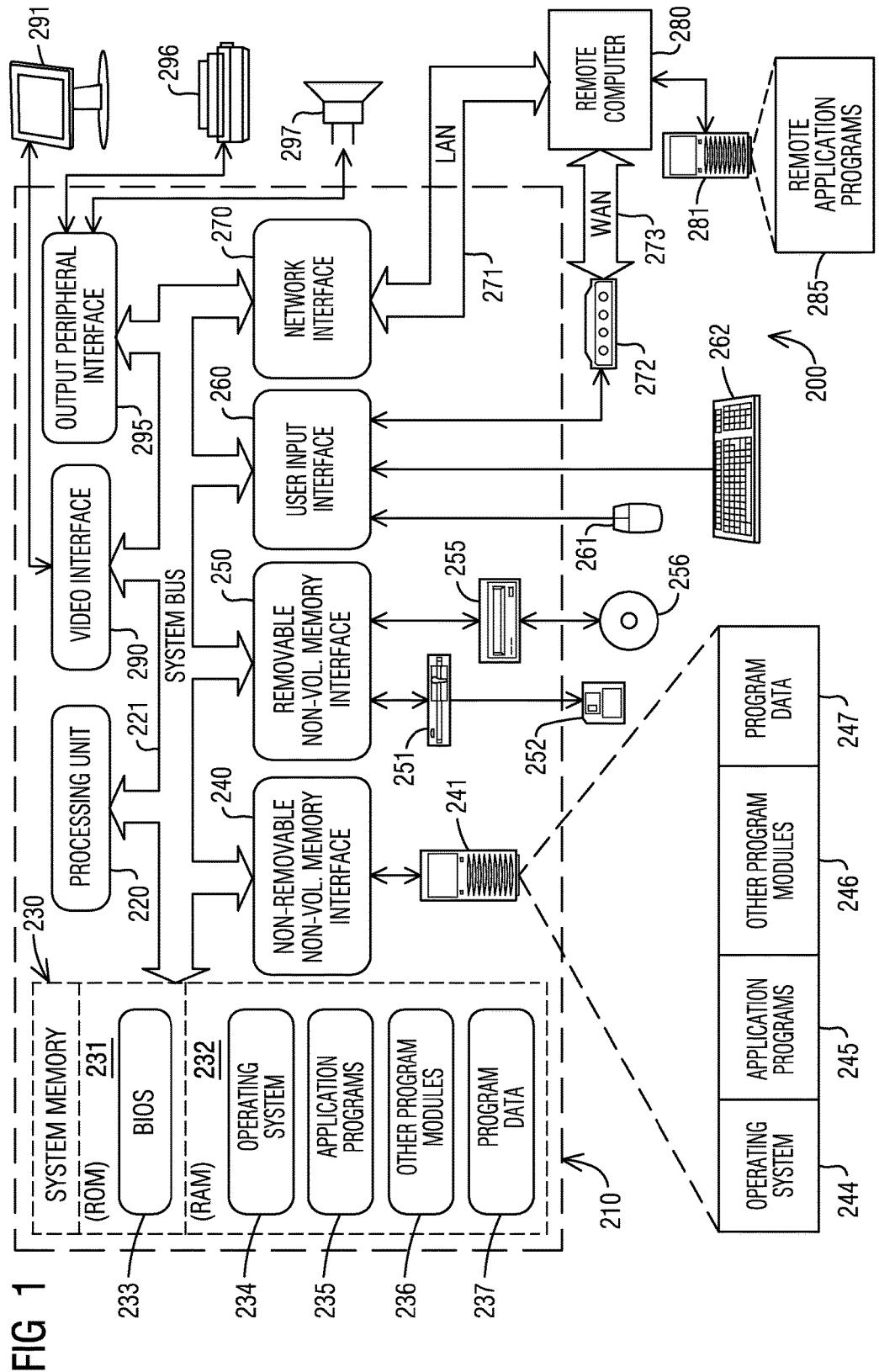
FIG. 1 is a block diagram representation of a computing environment and computer systems thereof, which a system of the present invention may utilize, in accordance with an exemplary embodiment of the present invention.

Referring now to FIG. 1, it displays a block diagram representation of a computing environment 200 and computer systems 210, 280 thereof, which a localization system may utilize, in accordance with an exemplary embodiment of the present invention. The computing environment 200 and the computer systems 210, 280 represent one example of a suitable computing environment and computer systems for the practice of embodiments of the present invention and are not intended to suggest any limitation as to the scope of use or functionality of the invention. Nor should the computer systems 210, 280 be interpreted as having dependency or requirement relating to the combination of components illustrated in the exemplary computing environment 200.

Embodiments of the present invention are operational with numerous other general purposes or special purposes computing system environments or configurations. Examples of well-known computing systems, environments, and/or configurations that may be appropriate or suitable for use as client systems include, but are not limited to, personal computers, server computers, hand-held or laptop devices, tablets, smart phones, multiprocessor systems, microprocessor-based systems, set top boxes, programmable consumer electronics, network PCs, minicomputers, mainframe computers, distributed computing environments that include portions of the above systems or devices, and the like.

Embodiments of the present invention may also be described in the general context of comprising computer executable instructions, such as program modules, being executed by a computer system. Generally, program modules include routines, programs, programming, objects, components, data, data structures, and the like that perform particular tasks or implement particular abstract data types.

Components of the computer system 210 may include, but are not limited to, a processing unit 220, a system memory 230, and a system bus 221 that couples various system components including the system memory 230 to the processing unit 220 for bi-directional data and/or instruction communication. The system bus 221 may be many of several types of bus structures including a memory bus or memory controller, a peripheral bus, and a local bus using any of a variety of bus architectures. By way of example, and not limitation, such architectures include the Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (i.e., also known as the "Mezzanine bus").

The computer system 210 can include and interact with a variety of computer-readable media. The computer-readable media may comprise many available media that can be accessed by, read from or written to by the computer system 210 and may include both volatile and non-volatile, removable, and non-removable media. For example and not limitation, computer-readable media may comprise computer storage media and communication media. Computer storage media includes volatile and non-volatile, removable, and non-removable media implemented in many methods or technologies for storage of information such as computer-readable instructions, data, data structures, program modules, programs, programming, or routines. Computer storage media includes, but is not limited to, RAM, ROM, EEPROM, flash memory or other memory technology, CD-ROM, digital versatile disks (DVD) or other optical disk storage, magnetic cassettes, magnetic tape, magneto-optical storage devices, magnetic disk storage or other magnetic storage devices, or other media that can be used to store the desired information and may be accessed by computer system 210. Communication media typically embodies computer-readable instructions, data, data structures, program modules, programs, programming, or routines in a modulated data signal, such as a carrier wave or other transport mechanism and includes any information delivery media. The term "modulated data signal" means a signal that has one or more of its characteristics set or changed in such a manner as to encode information in the signal. For example and not limitation, communication media includes wired media such as a wired network or direct-wired connection, and wireless media such as acoustic, RF, infrared and other wireless media. Various combinations of the above are also included within the scope of computer-readable media.

The system memory 230 may include computer storage media in the form of volatile and/or non-volatile memory such as read only memory (ROM) 231 and random access memory (RAM) 232. A basic input/output system 233 (BIOS), containing the basic routines that direct the transfer of information between elements within the computer system 210, such as during start-up, is typically stored in ROM 231. RAM 232 typically stores data and/or program instructions that are immediately accessible to and/or presently being operated on by the processing unit 220. By way of example, and not limiting, FIG. 1 illustrates an operating system 234, application programs 235, other program modules 236, and a program data 237, which may be resident in RAM 232, in whole or in part, from time-to-time.

The computer system 210 may also include other removable/non-removable, volatile/non-volatile computer storage media. By way of example only, FIG. 1 illustrates a hard disk drive 241 that reads from or writes to non-removable, non-volatile magnetic media, a magnetic disk drive 251 that reads from or writes to a removable, non-volatile magnetic disk 252, and an optical disk drive 255 that reads from or writes to a removable, non-volatile optical disk 256 such as a CD ROM or other optical media. Other removable/non-removable, volatile/non-volatile computer storage media that may be included in the exemplary computing environment 200 include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives 241, 251, 255 and their associated computer storage media discussed above provide storage of computer-readable instructions, data, data structures, program modules, programs, programming, or routines for computer system 210. For example, the hard disk drive 241 stores operating system 244, application programs 245, other program modules 246, and program data 247. These components may either be the same as or different from operating system 234, application programs 235, other program modules 236, and program data 237. The operating system 244, application programs 245, other program modules 246, and program data 247 are given different numbers to illustrate that, at a minimum, they are different copies of operating system 234, application programs 235, other program modules 236, and program data 237. A user may enter commands and information into computer system 210 through connected input devices, such as a keyboard 262 and pointing device 261, commonly referred to as a mouse, trackball or touch pad. Other connected input devices (not shown) may include a microphone, joystick, game pad, satellite dish, scanner, or the like. These and other input devices are often connected to the processing unit 220 through a user input interface 260 that is coupled to the system bus 221, but may be connected by other interface and bus structures, such as a parallel port, game port or a universal serial bus (USB). A monitor 291 or other type of display device may be also connected to the system bus 221 via an interface, such as a video interface 290. In addition to the monitor 291, the computer system 210 may also include other peripheral output devices such as speakers 297 and printer 296, which may be connected through an output peripheral interface 295.

The computer system 210 may operate in a networked environment using bi-directional communication connection links to one or more remote computer systems, such as a remote computer system 280. The remote computer system 280 may be a tablet, smart phone, personal computer, a laptop computer, a server computer, a router, a network PC, a peer device, or other common network node, and typically includes many or all of the elements described above relative to the computer system 210, although only a memory storage device 281 of the remote computer system 280 has been illustrated in FIG. 1. The bi-directional communication connection links depicted in FIG. 1 include a local area network (LAN) 271 and a wide area network (WAN) 273, but may also include other networks. Such networks are commonplace in offices, enterprise-wide computer networks, intranets, and the Internet.

In a preferred embodiment, aspects of the present invention can include a hand-held device (e.g., tablet or smart phone) with storage and wireless capability, meaning it can communicate via a wireless communication system, including but not limited to 1G, 2G, 3G, 4G and other cellular communication systems, but also Wi-Fi and the like. When communicatively connected to a LAN 271, the computer system 210 connects to the LAN 271 through a network interface or adapter 270. When communicatively connected to a WAN 273, the computer system 210 typically includes a modem 272 or other means for establishing a communication link over the WAN 273, such as the Internet. The communication system, or modem 272, which may be internal or external, may be connected to the system bus 221 via the user input interface 260, or other appropriate mechanism. In a networked environment, program modules depicted relative to the computer system 210, or portions thereof, may be stored in the remote memory storage device 281. By way of example, and not limiting, FIG. 1 illustrates remote application programs 285 as residing in memory storage device 281. The network connections shown are exemplary and other means of establishing a bi-directional communication link between the computers may be used.

In an exemplary embodiment, the localization system and method can operate on the computer system 210, and can be stored on a medium or media part of, in communication with, and/or connected to the computer system 210. In an exemplary embodiment, the ordering system can be developed in a programming language, for example and not limiting to, C, C++, Java, Assembly, COBOL, and the like. In an alternative embodiment, the ordering system can be developed atop a software program, for example and not limiting, LOTUS, Microsoft Excel, and other spreadsheet-like applications.

Figure 2:
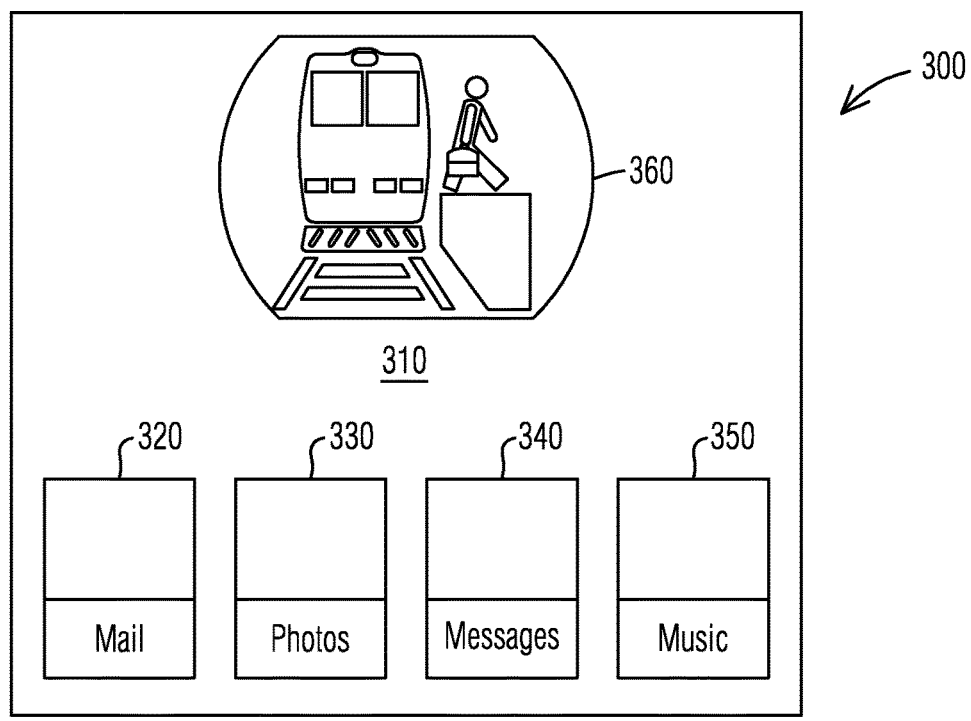
FIG. 2 is a graphical representation of a screen shot of a user interface device in accordance with an exemplary embodiment of the present invention.

FIG. 2 is a graphical representation of a screen shot 310 of a user interface device 300. For example, the user interface device 300 is a hand-held touch screen device, for example a smart phone, wherein the first screen shot 310 shows a plurality of icons 320, 330, 340, 350 and 360 identifying different mobile applications. As illustrated and without limitation, icon 320 refers to the application "Mail", icon 330 to the application "Photos", icon 340 to the application "Messages," and icon 350 to the application "Music". The user interface device 300 can comprise many other applications.

The localization system as described herein can be a mobile application identified by the icon 360, which may comprise a name, for example "YahGo", and a user can select, by selecting the icon 360 on the screen, also referred to as display, the application. After selecting the icon 360, a command which represents the icon is interpreted and communicated to the appropriate application, which is the localization system and method, stored within the user interface device 300. The user has activated and thus entered the localization system. Many other graphical representations can be used for the icons/applications 320, 330, 340, 350, 360.

In an exemplary embodiment, the mobile application of the localization system can operate upon various operating computer systems, for example and without limitation Apple® iOS, Google® Android, Windows® operating systems, and the like.

Figure 3:
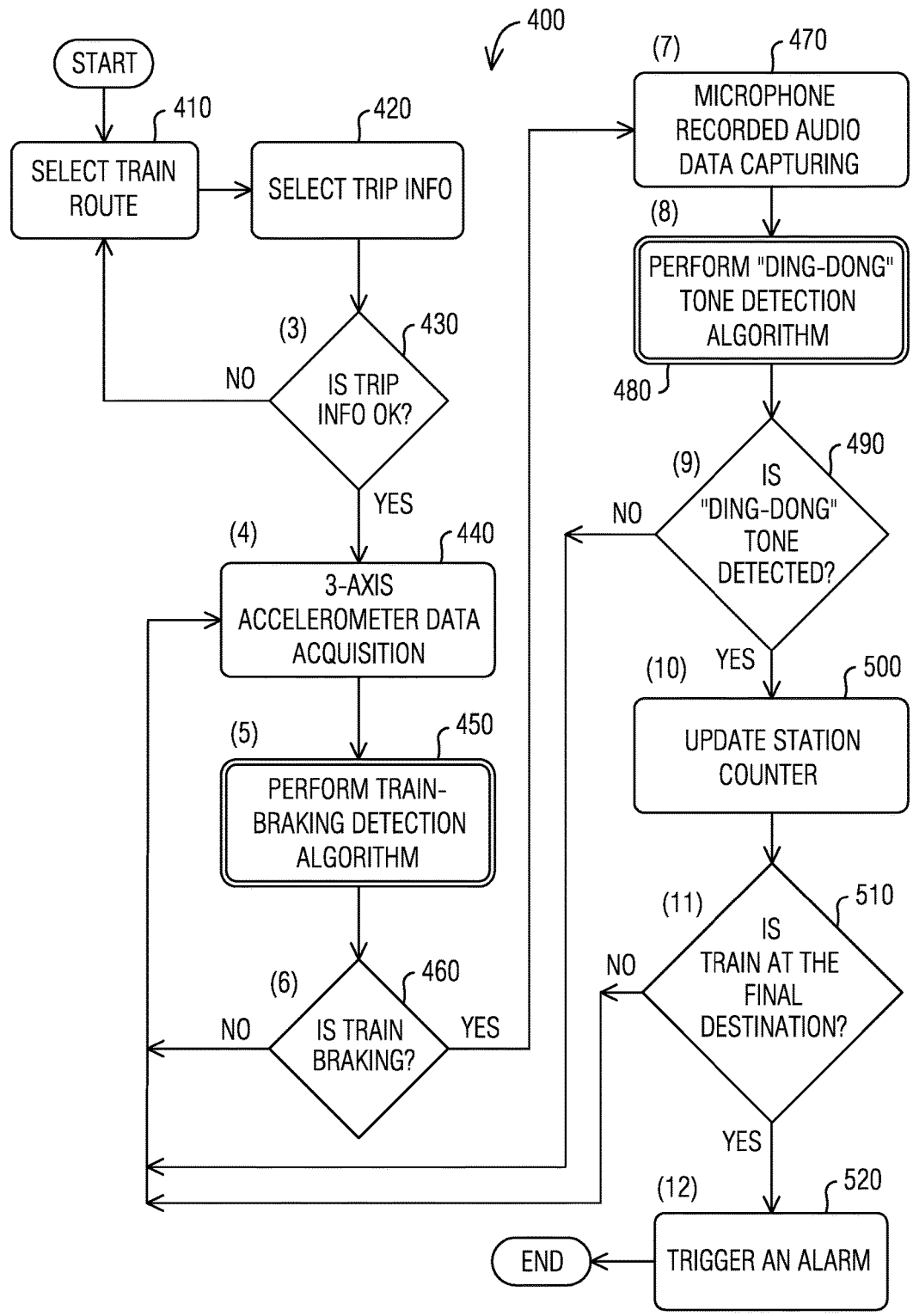
FIG. 3 illustrates a flow chart of a method for determining a location of a vehicle relative to a stopping point in accordance with an exemplary embodiment of the present invention.

FIG. 3 illustrates a flow chart of a method 400 for determining a location of a vehicle relative to a stopping point in accordance with an exemplary embodiment of the present invention.

After activating icon 360 (see FIG. 2), the mobile application associated with the icon 360, prompts the user to enter travel data. The application system provides an intuitive user interface. For example, when using the mobile application for the New York City (NYC) subway system, in a first step 410, the application prompts the user to enter first travel information. In an embodiment, the application prompts the user in step 410 to select a train route of the NYC subway system. The user may select the "L" line. Trains of the "L" line operate between 8 Av/14 St, Manhattan, and Rockaway Pkwy/Canarsic, Brooklyn. Based on the train route selected in step 410, the system prompts the user in a second step 420 to enter second travel information which supplements the first travel information. The second travel information is more specific compared to the first travel information. In this example, the system prompts the user to enter the desired start train route station and the desired end train route station of the selected "L" line. For example, if the traveller enters the subway train at station "Bedford Av" and wants to exit at station "Sutter Av", the traveller would manually enter these stations into the application using the mobile device. Alternatively, the application may be configured such that, after selecting a train route, a drop down menu comprising all the stations of the selected route is provided and the user simply needs to select the desired station. In a third step 430, the system prompts the user to confirm the details of the trip. If the user entered the wrong data or changed travel plans, the user can now change the details of the trip. The first and second travel information and the confirmation of the trip (steps 410, 420, 430) should be entered before or when entering the train so that the application starts when the train starts moving.

When the user has entered all the requested information in steps 410, 420, 430, and has confirmed the trip information, the localization system proceeds to step 440. As soon as the user has entered the underground vehicle, in this example an underground train of the "L" line of the NYC subway system, and the train starts moving, data on how the underground train travels on the track are acquired, collected and stored for further analysis. In order to acquire such data, the mobile device, which is for example a smart phone, requires at least one 3-axis-accelerometer. Accelerometers and also gyroscopes are typically included in recent mobile devices. Raw accelerometer data is collected and stored for example as acceleration values in m/s$^2$ in sample sets for each axis x, y, z together with timestamps of measured accelerations. Furthermore, these raw acceleration data are used to acquire linear acceleration, for example using a virtual linear accelerometer class provided by operating systems installed on the mobile device. At least one low pass filters is used as noise reduction filter to obtain values that are most representative for train movement. The at least one low pass filter minimizes basic noise in the collected accelerometer readings.

In step 450, the linear acceleration values obtained in step 440 are analyzed to determine if the train is braking using pattern matching. In particular, a first algorithm, referred to as train-braking-detection-algorithm, is performed. In particular, the localization system applies a pattern recognition algorithm to algorithmically evaluate feature extraction of the train movement. In step 460, by comparing the results obtained in step 450 with a certain predefined threshold, it is possible to conclude if the train is actually braking or not. When the train is braking, the method proceeds to step 470. Otherwise, the method continues to collect and store acceleration data of the moving vehicle, see step 440.

When a brake of the train is detected in step 460, the method proceeds to step 470 comprising recording audio information emitted by the vehicle. In particular, raw audio data emitted via an onboard microphone of the vehicle is captured. The raw audio data is processed and filtered to remove background noise. For example, as soon as brake application is detected, a timer countdown starts comprising a time interval of how long it usually takes for the vehicle to stop after brake application has begun. The mobile application then "listens" for frequencies that identify when the train door closing begins and applies a second algorithm, a tone-detection-algorithm, which converts time-based audio data obtained in step 470 into frequency domain and applies frequency band filter(s) to extract a "ding dong" spectrogram. The "ding dong" tone is a tone which is always emitted, in particular in a train of the NYC subway, before the train door close and the train starts moving again. When the "ding dong" sound has been detected, step 490, it is stored within the mobile device 300 (see FIG. 2) and the application proceeds to step 500. If the typical "ding dong" tone has not been detected, the application returns to step 440 and continues to collect and store acceleration data of the vehicle. Such a situation may occur for example after an unplanned stop of the vehicle in between stations on the track due for example an obstacle on the track. In this case, the application detected that the vehicle did slow down and brake, but the "ding dong" tone was not detected because the vehicle doors would not open and/or close. Thus, the application continues to collect and store acceleration data.

In step 500, the system updates a count of the route stations the train has passed after the "ding dong" tone has been detected because the train has actually stopped at a designated station of the route. For example, the train stopped at station "Morgan Ave" which is between the stations "Bedford Av" and "Sutter Av" which are the defined start and end stations as input by the user in the mobile device in steps 410, 420, 430. The localization system compares the current route station count, for example "Morgan Ave", to the station specified as end station by the user in step 420. The end station specified by the user is "Sutter Ave". As the current route station count is not the end station as specified by the user, the application returns to step 440 and repeats steps 440 through 510 until the application determines that the current route station is the same as the specified end station by the user. In such a case, an alarm is generated by the mobile device 300 (see FIG. 2) to notify the user that he/she has arrived at the final destination of the trip. Such an alarm can be a visual alarm, audio alarm, vibration alarm or a combination thereof.

The provided localization system and method describe an application for a mobile device comprising a location analysis used in underground vehicles, for example in underground transportation systems, such as for example subway systems, which does not use GPS or Wi-Fi positioning. Instead, the localization system and method use accelerometer-based inertial navigation. Inertial navigation is a self-contained navigation technique in which measurements provided by accelerometers are used to track the position and orientation of an object relative to a known starting point, orientation and velocity. Details of inertial navigation are not described herein as one skilled in the art is familiar with this type of navigation. In particular, sound- and accelerometer-based localization algorithms are applied for en route station detection of the vehicle. The described positioning system and method for underground public transportation systems rely solely on the mobile device requiring an accelerometer which is built into most modern mobile devices such as smart phones. In addition, because all calculations are done locally on the mobile device, the user's position is not shared with any central server or third parties.

In summary, a first algorithm is used to detect vehicle brake application using acceleration data from an accelerometer of the mobile device. A second algorithm is used for sound recognition of tones emitted by the vehicle, while at standstill, indicating en route station arrival and/or departure. The localization system and method collect and process data collected by the accelerometer and microphone data while the vehicle is traversing its route and intelligently determine the location of the vehicle relative to the stations at which the train stops. A similar approach with slight modification can be applied to many different scenarios where GPS or Wi-Fi connectivity is poor or negligible, for example in tunnels. The described localization system and method can for example help tourists navigate foreign subway systems, especially when they do not speak and/or cannot read the native language. The system can inform the tourist who cannot understand the announcements of when to prepare to exit the train, an especially important concern when the train is crowded.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A system for determining a location of a vehicle relative to a stopping point, the system comprising:
   a vehicle of an underground transportation system; and
   a user interface device comprising a memory device storing a computer program with executable instructions, the computer program comprising first executable instructions to detect a vehicle brake application of the vehicle and second executable instructions to detect audio data emitted by the vehicle, the first and second executable instructions being performed to determine a location of the vehicle relative to a designated stopping point of the vehicle, wherein the user interface device comprises at least one accelerometer for acquiring acceleration data of the vehicle, the first executable instruction comprising a first algorithm adapted to collect and store the acceleration data of the vehicle.

2. The system of claim 1, wherein the first executable instructions comprise a first algorithm and the second executable instructions comprise a second algorithm.

3. A method for determining a location of a vehicle relative to a station comprising:
- receiving input travel data including an end route station of a selected route provided by a user;
- collecting accelerometer data of a vehicle;
- detecting a vehicle brake application of the vehicle based on collected acceleration data;
- detecting audio data emitted by the vehicle,
- determining that the vehicle is located at a route station based on a detected brake application and detected audio data and updating a station counter;
- comparing the route station to the end route station based on the station counter; and
- generating an alarm when the route station corresponds to the end route station for notifying the user of the end route station.

4. The system of claim 2, wherein the second algorithm is adapted to detect audio data emitted by the vehicle, wherein the user interface device comprises at least one recording device for collecting audio data emitted by the vehicle.

5. The system of claim 1, wherein the user interface device is selected from the group consisting of a touch screen device, a tablet, a smart phone, and a handheld computing device.

6. The system of claim 1, wherein the vehicle is a train of the underground transportation system.

7. A non-transitory computer readable medium comprising computer instructions capable of being executed in a processor and performing a method for determining a location of a vehicle relative to a station, the method comprising:
- receiving input travel data including an end route station of a selected route provided by a user;
- collecting acceleration data of a vehicle;
- detecting a vehicle brake application of the vehicle based on collected acceleration data;
- detecting audio data emitted by the vehicle,
- determining that the vehicle is located at a route station based on a detected brake application and detected audio data and updating a station counter;
- comparing the route station to the end route station based on the station counter; and
- generating an alarm when the route station corresponds to the end route station for notifying the user of the end route station.

8. The method of claim 3, wherein the accelerometer data of the vehicle are acquired using at least one 3-axis-accelerometer.

9. The non-transitory computer readable medium of claim 7, wherein the acceleration data of the vehicle are acquired by at least one accelerometer.

10. The method of claim 3, wherein the vehicle is a train of an underground transportation system.

11. The method of claim 3, wherein the method comprises a mobile application for a user interface device selected from the group consisting of a touch screen device, a tablet, a smart phone, and a handheld computing device.

12. The method of claim 3, further comprising:
- storing the accelerometer data of the vehicle.

13. The method of claim 12, wherein the accelerometer data of the vehicle are filtered using at least one low pass filter.

14. The method of claim 3, further comprising:
- prompting the user to provide the input travel data, the travel data further comprising a start station of the selected route of the vehicle.

15. The method of claim 3, further comprising:
- capturing and storing audio information emitted by the vehicle.

* * * * *